US010362737B2

(12) United States Patent
Dufty

(10) Patent No.: US 10,362,737 B2
(45) Date of Patent: Jul. 30, 2019

(54) ROLLER ASSEMBLY

(71) Applicants: Dorothea Isabel Maud Rix, Arundel (AU); Raymond Jeffrey Dufty, Arundel (AU)

(72) Inventor: Raymond Jeffrey Dufty, Arundel (AU)

( * ) Notice: Subject to any disclaimer, the term of this patent is extended or adjusted under 35 U.S.C. 154(b) by 0 days.

(21) Appl. No.: 15/750,694

(22) PCT Filed: Aug. 8, 2016

(86) PCT No.: PCT/AU2016/095002
§ 371 (c)(1),
(2) Date: Feb. 6, 2018

(87) PCT Pub. No.: WO2017/024364
PCT Pub. Date: Feb. 16, 2017

(65) Prior Publication Data
US 2018/0220598 A1    Aug. 9, 2018

(30) Foreign Application Priority Data
Aug. 7, 2015 (AU) ................................ 2015903165

(51) Int. Cl.
| E01C 19/26 | (2006.01) |
| A01G 20/35 | (2018.01) |
| A01G 20/12 | (2018.01) |
| A01G 20/30 | (2018.01) |
| A01B 29/02 | (2006.01) |
| A01B 79/00 | (2006.01) |

(52) U.S. Cl.
CPC .............. *A01G 20/35* (2018.02); *A01B 29/02* (2013.01); *A01B 79/00* (2013.01); *A01G 20/12* (2018.02); *A01G 20/30* (2018.02); *E01C 19/26* (2013.01)

(58) Field of Classification Search
CPC ........ A01G 20/12; A01G 20/30; A01G 20/35; A01B 29/02; A01B 79/00; E01C 19/26
USPC .................. 404/117, 119, 122–126, 131, 132
See application file for complete search history.

(56) References Cited

U.S. PATENT DOCUMENTS

| 1,981,788 | A | * | 11/1934 | Gardner | .................. E01C 19/25 404/111 |
| 3,038,349 | A | * | 6/1962 | Meyer | ................... E01C 19/238 404/123 |
| 3,038,350 | A | * | 6/1962 | Meyer | ................... E01C 19/262 404/123 |

(Continued)

FOREIGN PATENT DOCUMENTS

| CA | 2668238 A1 | 12/2010 |
| CA | 2883187 A1 | 4/2015 |

*Primary Examiner* — Raymond W Addie
(74) *Attorney, Agent, or Firm* — Hudak, Shunk & Farine Co. LPA

(57) ABSTRACT

A roller assembly including: a frame; a first undercarriage connected to the frame, the first undercarriage comprising: a first body; a rear roller connected to the first body; and a first overlapping roller that is elongate and connected to the first body; and a second undercarriage connected to the frame, the second undercarriage comprising: a second body; a front roller connected to the second body; and a second overlapping roller that is elongate and connected to the second body, wherein the first undercarriage is positioned adjacent to the second undercarriage such that the first overlapping roller overlaps the second overlapping roller.

22 Claims, 5 Drawing Sheets

(56) References Cited

U.S. PATENT DOCUMENTS

| | | | | |
|---|---|---|---|---|
| 4,149,253 A | * | 4/1979 | Paar | E02D 3/026 |
| | | | | 404/117 |
| 4,802,790 A | * | 2/1989 | Tondini | E01C 19/28 |
| | | | | 404/117 |
| 5,046,889 A | * | 9/1991 | Sterner, Jr. | E01C 19/16 |
| | | | | 404/103 |
| 5,064,000 A | * | 11/1991 | Dover | A01G 20/15 |
| | | | | 172/19 |
| 6,457,903 B1 | | 10/2002 | Dufty | |
| 7,704,012 B2 | * | 4/2010 | Lura | E01C 19/402 |
| | | | | 404/118 |
| 8,414,220 B1 | * | 4/2013 | Koba | E01C 19/281 |
| | | | | 404/117 |
| 9,028,168 B1 | * | 5/2015 | Knapp | E01C 19/29 |
| | | | | 404/103 |
| 9,883,629 B2 | * | 2/2018 | Smith | A01D 43/12 |
| 2009/0129865 A1 | | 5/2009 | Dufty | |
| 2015/0247295 A1 | * | 9/2015 | Tarantin | E01C 19/233 |
| | | | | 404/125 |

* cited by examiner

ROLLER ASSEMBLY

FIELD OF THE INVENTION

The invention relates to a roller assembly. In particular, the invention relates, but is not limited, to a roller assembly for smoothing turf.

BACKGROUND TO THE INVENTION

Reference to background art herein is not to be construed as an admission that such art constitutes common general knowledge in Australia or elsewhere.

Turf rollers are typically used in the maintenance of, for example, golf greens. Turf rollers assist in providing a firm, smooth and consistent golf green. Turf rollers may include a number of adjacent undercarriages that are connected to a main support frame.

In practice, it has been found that a gap between adjacent undercarriages results in non-uniform rolling of, for instance, golf greens. In particular, the gap between the adjacent undercarriages results in a strip of turf being unrolled. This results in an inconsistent golf green which is substandard for major golf tournaments and alike.

In addition, allowing undercarriages to manoeuvre for turning, whilst ensuring that undulations and imperfections in a ground surface are rolled out, may also create another source for leaving marks on a golf green. This again is substandard for major golf tournaments and alike.

OBJECT OF THE INVENTION

It is an aim of this invention to provide a roller assembly which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a roller assembly, the roller assembly including:
 a frame;
 a first undercarriage connected to the frame, the first undercarriage comprising:
  a first body;
  a rear roller connected to the first body; and
  a first overlapping roller that is elongate and connected to the first body; and
 a second undercarriage connected to the frame, the second undercarriage comprising:
  a second body;
  a front roller connected to the second body; and
  a second overlapping roller that is elongate and connected to the second body,
 wherein the first undercarriage is positioned adjacent to the second undercarriage such that the first overlapping roller overlaps the second overlapping roller.

Preferably, the first overlapping roller projects approximately across at least a quarter of the rear roller. Preferably, the second overlapping roller projects approximately across at least a quarter of the front roller.

Preferably, the first overlapping roller projects approximately across at least a third of the rear roller. Preferably, the second overlapping roller projects approximately across at least a third of the front roller.

Preferably, the first overlapping roller projects approximately across at least half of the rear roller. Preferably, the second overlapping roller projects approximately across at least half of the front roller.

Preferably, the first overlapping roller projects approximately across at least two thirds of the rear roller. Preferably, the second overlapping roller projects approximately across at least two thirds of the front roller.

Preferably, the first overlapping roller projects approximately across at least three quarters of the rear roller. Preferably, the second overlapping roller projects approximately across at least three quarters of the front roller.

Preferably, the first overlapping roller projects completely across the rear roller. Preferably, the second overlapping roller projects completely across the front roller.

Preferably, the first overlapping roller projects anywhere between approximately a quarter to completely across the rear roller. Preferably, the second overlapping roller projects anywhere between approximately a quarter to completely across the front roller.

Preferably, the first overlapping roller is at least half the length as the rear roller or greater. Preferably, the second overlapping roller is at least half the length as the front roller or greater.

Preferably, the first overlapping roller is substantially the same length as rear roller or longer. Preferably, the second overlapping roller is substantially the same length as rear roller or longer.

Preferably, the rolling assembly includes a first intermediate roller. Normally, the rolling assembly includes a second intermediate roller.

Preferably, the first intermediate roller and/or the second intermediate roller is located between the first overlapping roller and the second overlapping roller.

Preferably, the first intermediate roller is located between the rear roller and the first overlapping roller. Typically, the second intermediate roller is located between the front roller and the second overlapping roller.

Preferably, the first intermediate roller and the second intermediate roller are substantially the same distance from a longitudinal axis of the frame. Normally, the first intermediate roller is longitudinally aligned with the second intermediate roller.

Preferably, the first intermediate roller is substantially the same size as the rear roller. Normally, the first intermediate roller is substantially the same length as the rear roller. Typically, the second intermediate roller is substantially the same size as the front roller. Preferably, the second intermediate roller is substantially the same length as the front roller.

Preferably, the first undercarriage and/or the second undercarriage are connected at a first end of the frame. Normally, a driving roller is connected at another end of the frame.

Normally, the first undercarriage and/or the second undercarriage are located to one side of a longitudinal axis of the frame. Typically, the driving roller is located to another side of the longitudinal axis of the frame. Preferably, the longitudinal axis of the frame is located centrally between end walls of the frame.

Normally, the first undercarriage is substantially located to one side of a lateral axis of the frame and the second undercarriage is substantially located to another side the lateral axis of the frame. Preferably, the lateral axis of the frame is located centrally between side walls of the frame.

Preferably, the lateral axis of the frame is located centrally between the first undercarriage and the second undercarriage.

Typically, the first undercarriage and/or the second undercarriage extend in a direction that is substantially parallel with the longitudinal axis of the frame. Normally, the first undercarriage and the second undercarriage are aligned. Typically, the first undercarriage and the second undercarriage are aligned in a direction parallel with the longitudinal axis of the frame. Preferably, the driving roller extends in a direction that is substantially parallel with the longitudinal axis of the frame.

Preferably, the first overlapping roller, second overlapping roller, rear roller and/or front roller extend substantially parallel to the longitudinal axis of the frame. That is, normally in a straight steering direction, the first overlapping roller, second overlapping roller, rear roller and/or front roller extend substantially parallel to the longitudinal axis of the frame.

Preferably, the first overlapping roller is located at a different distance from the longitudinal axis of the frame compared to the second overlapping roller. Typically, the second overlapping roller is located at a further distance away from the longitudinal axis of the frame compared to the first overlapping roller.

Typically, the first overlapping roller is located forward of the second overlapping roller. Preferably, the first overlapping roller and the second overlapping roller are staggered in a forward direction. Normally, the first overlapping roller is located near the front roller.

Normally, the first overlapping roller and the second overlapping roller extend up to and/or across the lateral axis of the frame. Preferably, the first overlapping roller and the second overlapping roller are offset relative to the lateral axis. Preferably, the rear roller and the front roller are located next to the lateral axis of the frame and extend away therefrom. Preferably, the rear roller and the front roller are offset relative to the lateral axis.

Preferably, the first body includes a first main portion and a first offset portion. Typically, the first offset portion extends away from the first main portion. Preferably, the first main portion is located next to the lateral axis of the frame. Preferably, the first main portion extends away from the lateral axis of the frame. Normally, the first offset portion extends to and/or across the lateral axis of the frame.

Preferably, the rear roller is connected between side walls of the first main portion. Typically, the first intermediate roller is connected between side walls of the first main portion. Preferably, the first overlapping roller is connected between a side wall of the first main portion and a side wall of the first offset portion.

Preferably, the second body includes a second main portion and a second offset portion. Normally, the second offset portion extends away from the second main portion. Preferably, the second main portion is located next to the lateral axis of the frame. Preferably, the second main portion extends away from the lateral axis of the frame. Typically, the second offset portion extends to and/or across the lateral axis of the frame. Preferably, the first offset portion substantially mirrors the second offset portion.

Preferably, the first undercarriage and/or the second undercarriage are pivotally connected to the frame.

Preferably, a steering system assists in moving the first undercarriage and/or the second undercarriage about their pivotal connection to the frame. Preferably, the steering system includes a plurality of steering links that are configured to turn the first undercarriage and/or the second undercarriage about their pivotal connection to the frame.

Preferably, the first overlapping roller and/or the second overlapping roller includes a plurality rollers.

In another form, although not necessarily the only or broadest form, the invention resides in a roller assembly, the roller assembly including:

a frame;

a first undercarriage connected to the frame, the first undercarriage comprising:

a first body;

a rear roller connected to the first body; and a first overlapping roller connected to the first body; and a second undercarriage connected to the frame, the second undercarriage comprising:

a second body;

a front roller connected to the second body; and a second overlapping roller connected to the second body, wherein the first undercarriage is aligned with the second undercarriage such that the first overlapping roller overlaps the second overlapping roller.

Normally, the first undercarriage is aligned with the second undercarriage in a longitudinal direction. Preferably the longitudinal direction is parallel with a longitudinal axis of the frame.

Preferably, the first undercarriage is substantially located to one side of a lateral axis of the frame and the second undercarriage is located substantially to another side the lateral axis of the frame.

Typically, the first undercarriage is located to a left or right side of the second undercarriage.

Preferably, the first undercarriage and/or the second undercarriage is herein as described.

In another form the invention resides in an undercarriage, the undercarriage including:

a body;

a roller connected to the body; and an elongate overlapping roller that is connected to the body and extends beyond an end of the roller; and wherein an intermediate roller is located between the roller and the overlapping roller.

Preferably, the undercarriage is herein as described with reference to the first undercarriage and/or the second undercarriage.

In another form the invention resides in a method for rolling a surface, the method including the steps of:

rolling the surface with a plurality of front rollers such that one or more surface gaps are left therebetween on the surface; and rolling the surface with a plurality of rear rollers such that the one or more surface gaps are rolled, wherein the plurality of front rollers and the plurality of rear rollers are mounted to undercarriages that are substantially aligned.

Normally, the undercarriages include a first undercarriage that is substantially aligned with a second undercarriage in a longitudinal direction.

Preferably, the method further includes the step of rolling the surface with a first intermediate roller. Preferably, the first intermediate roller is located between a first roller of the plurality of front rollers and a first roller of the plurality of rear rollers. Preferably, the first roller of the plurality of front rollers and the first roller of the plurality of rear rollers are connected to the first undercarriage.

Preferably, the method further includes the step of rolling the surface with a second intermediate roller. Preferably, the second intermediate roller is located between a second roller of the plurality of front rollers and a second roller of the plurality of rear rollers. Preferably, the second roller of the plurality of front rollers and the second roller of the plurality of rear rollers are connected to the second undercarriage.

Preferably, the method further includes the step of turning the plurality of front rollers and the plurality of rear rollers from a first direction to a second direction. Preferably, the method further includes the step of turning the first intermediate roller and the second intermediate roller from the first direction to the second direction.

Preferably, the method further includes the step of driving a driving roller to initiate movement of the plurality of front rollers and the plurality of rear rollers.

Preferably, the plurality of front rollers are herein described with reference to the front roller and first overlapping roller. Preferably, the plurality of rear rollers are herein described with reference to the rear roller and second overlapping roller.

In another form the invention resides in a method for rolling a surface, the method including the steps of:

rolling the surface with a front roller and a first overlapping roller, the first overlapping roller being elongate; and rolling the surface with a rear roller and a second overlapping roller, the second overlapping roller being elongate.

Preferably, the front roller is located substantially next to the first overlapping roller.

Preferably, the second overlapping roller is located substantially next to the second overlapping roller.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
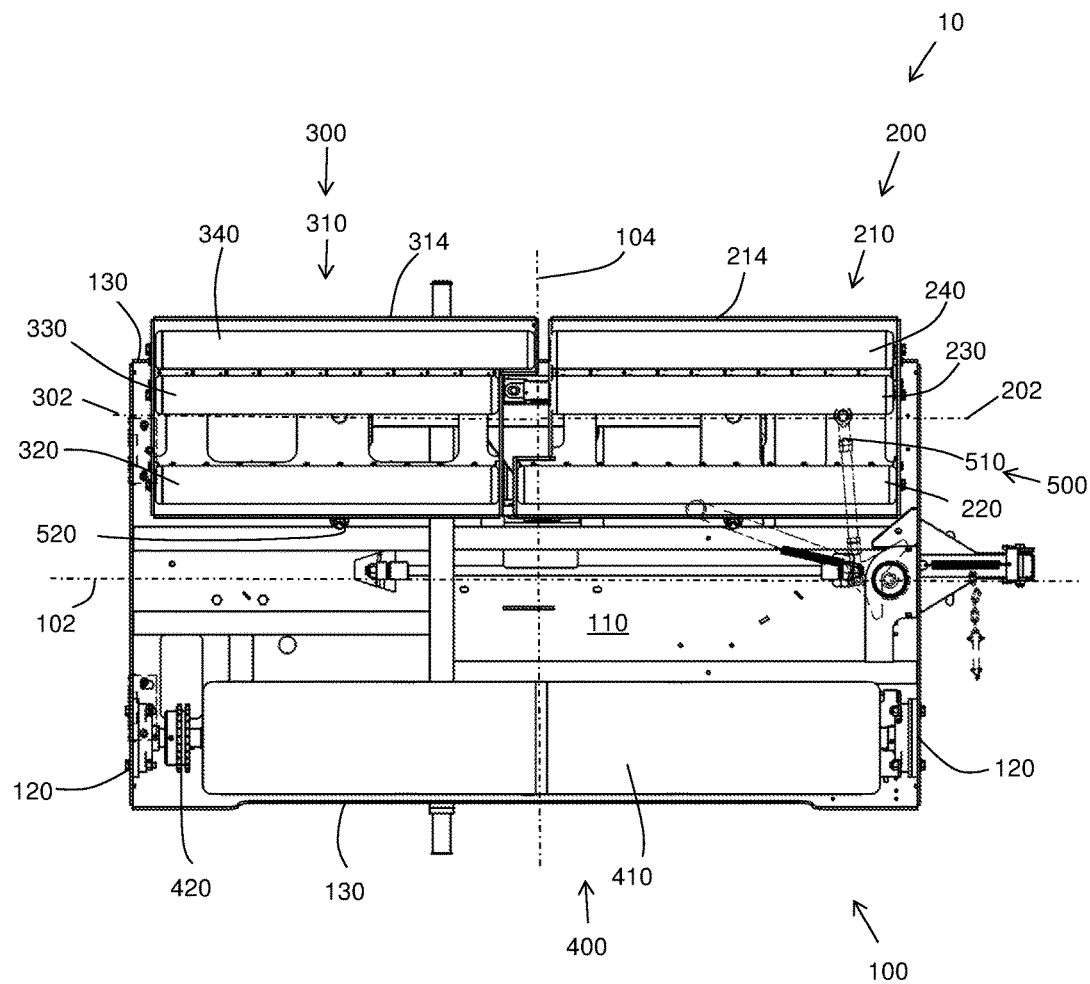
FIG. 1 illustrates a bottom view of a roller assembly, according to an embodiment of the invention.
Figure 2:
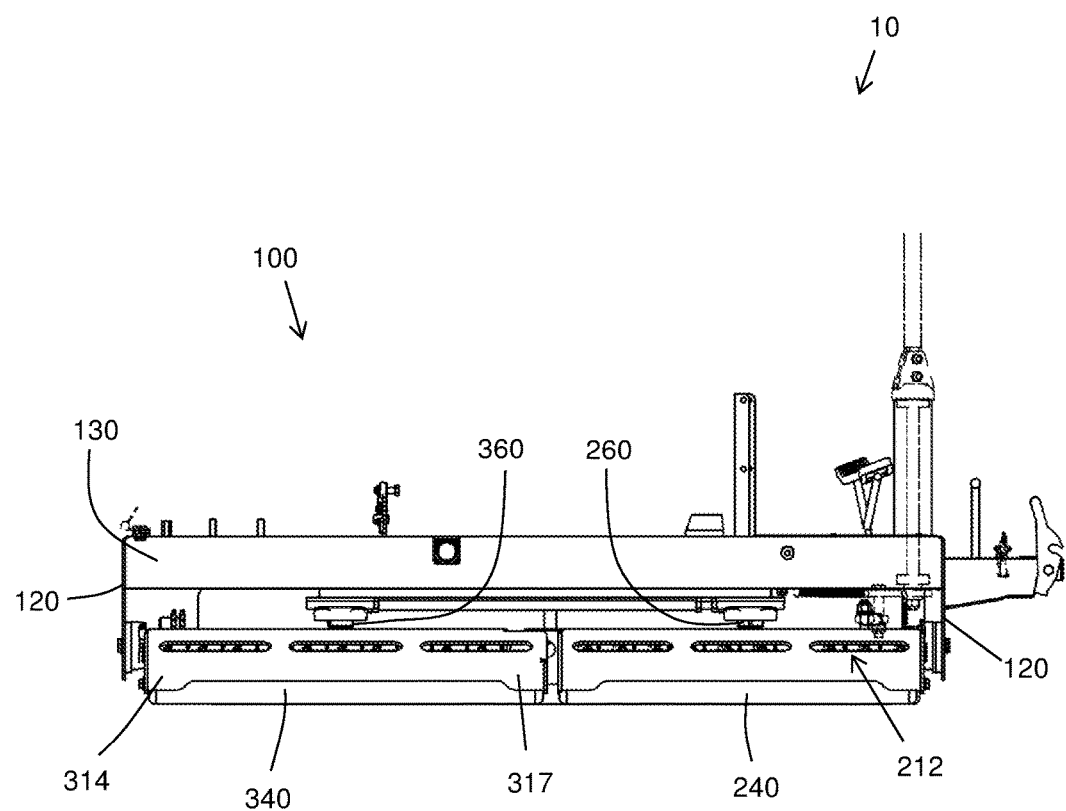
FIG. 2 illustrates a rear view of the roller assembly shown in FIG. 1.

FIGS. 1 and 2 illustrate a roller assembly 10, according to an embodiment of the invention. The roller assembly 10 includes a frame 100, a first undercarriage 200, a second undercarriage 300, a driving assembly 400 and a steering system 500.

The frame 100 includes a top wall 110, side walls 120 and end walls 130. The side walls 120 extend substantially perpendicular from the top wall 110 in a downward direction. Similarly, the end walls 130 extend substantially perpendicular from the top wall 110 in a downward direction.

The end walls 130 are connected to the side walls 120 to form a housing. The housing is substantially box-shape in this embodiment.

The frame 100 includes a longitudinal axis 102. The longitudinal axis 102 is located substantially centrally between the end walls 130. The frame 100 also includes a lateral axis 104. The lateral axis 104 is located substantially centrally between the side walls 120. That is, the lateral axis 104 is located approximately between the first undercarriage 200 and the second undercarriage 300.

The first undercarriage 200 is similar to the second undercarriage 300 but, as outlined below, there are differences therebetween. With this in mind, it is noted here that the use of the terms 'first', 'second', 'front', 'rear' and alike in this specification are used to distinguish one element (or action) from another element (or action) without necessarily requiring or implying any such order.

Figure 3:
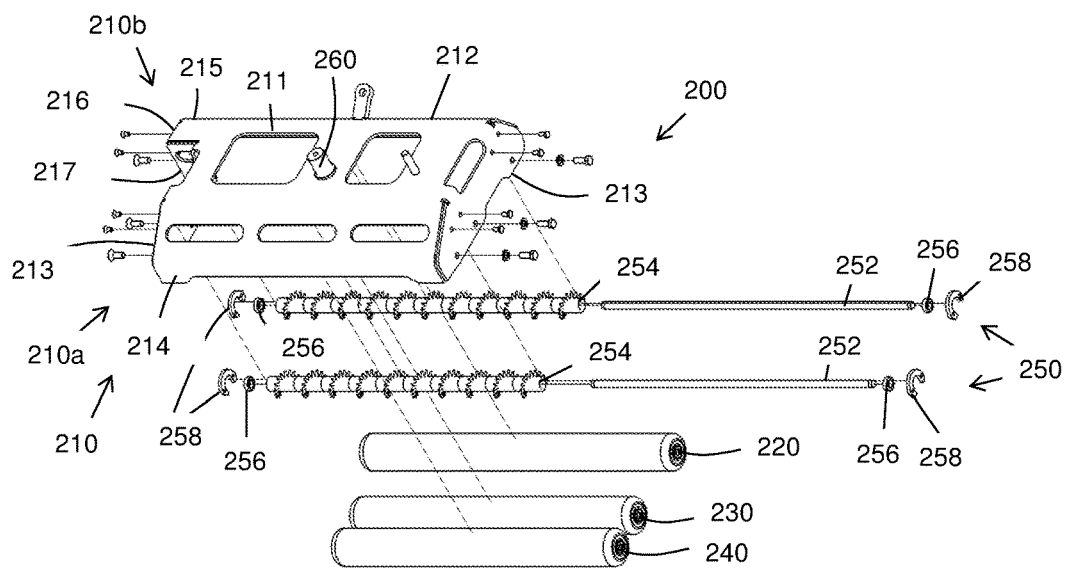
FIG. 3 illustrates an exploded view of an undercarriage shown in FIG. 1, according to an embodiment of the invention.

As shown further in FIG. 3, the first carriage 200 includes a first body 210, a first overlapping roller 220, a first intermediate roller 230, a rear roller 240, rotatable sweeping devices 250 and a first pivot mount 260. It would be appreciated that the first overlapping roller 220 may, for example, be considered as a further front roller or alike in the present context.

The first body 210 includes a first main portion 210*a* and a first offset portion 210*b*. The first main portion 210*a* includes a top wall 211, a front wall 212, side walls 213 and a rear wall 214. The front and rear walls 212, 214 extend at an acute angle from the top wall 211 but it would be appreciated that they may, for example, extend substantially perpendicular to the top wall 211 or alike. The side walls 213 extend substantially perpendicular from the top wall 211. The top wall 211, front wall 212, rear wall 214 and side walls 213 form an enclosure from which the first offset portion 210*b* extends.

The first offset portion 210*b* is out of line with at least one of the side walls 213 of the first main portion 210*a*. The first offset portion 210*b* includes a front wall 215, a side wall 216 and a rear wall 217. The first offset portion 210*b* extends in a direction substantially parallel with a longitudinal axis 202 of the first undercarriage 200. Accordingly, the first offset portion 210*b* extends substantially perpendicular from one of the side walls 213 of the first main portion 210*a*. As such, the front wall 215 and the rear wall 217 extend substantially perpendicular to one of the side walls 213 of the first main portion 210*a*.

The first overlapping roller 220 is located between the side wall 216 of the first offset portion 210*b* and one of the side walls 213 of the first main portion 210*a*. The first overlapping roller 220 is elongate. The first intermediate roller 230 and the rear roller 240 are located between the side walls 213 and connected thereto. One end of the first overlapping roller 220 is therefore offset from the first intermediate roller 230 and/or the rear roller 240.

The first overlapping roller 220 is located to one side of the longitudinal axis 202 of the first undercarriage 200 whilst the rear roller 240 is located to the other side of the longitudinal axis 202. In particular, the first overlapping roller 220 is located near the front wall 212 whilst the rear roller 240 is located near the rear wall 214.

The first intermediate roller 230 is located between the first overlapping roller 220 and the rear roller 240. The distance between the first intermediate roller 230 and the rear roller 240 is shorter than the distance between the first intermediate roller 230 and the first overlapping roller 220.

Accordingly, the first intermediate roller 230 is offset at a different distance between the first overlapping roller 220 and the rear roller 240.

In the present embodiment, the first overlapping roller 220 is longer than the first intermediate roller 230 and the rear roller 240. That is, the length of the first overlapping roller 220 is greater than the first intermediate roller 230 and the rear roller 240. In addition, the first overlapping roller 220 projects completely across the rear roller 240 and/or the first intermediate roller 220. That is, for example, if the rear surface of the first overlapping roller 220 was projected along the lateral axis 104 to produce a corresponding figure on the rear roller 240, this corresponding figure would completely cover the rear roller 240.

The first overlapping roller 220 in this embodiment is also one continuous roller but it would be appreciated that the first overlapping roller 220 may be made up of a plurality of rollers that form the first overlapping roller 220. Typically, the first intermediate roller 230 and the rear roller 240 are substantially the same length.

One of the rotatable sweeping devices 250 is located above the first overlapping roller 220. The other rotatable sweeping device 250 is located above the first intermediate roller 230 and the rear roller 240. The rotatable sweeping devices 250 each include an elongate member 252 and a plurality of sweeping heads 254 located over the elongate member 252. The sweeping heads 254 are rotatable with respect to the elongate member 252.

Located at each end of the elongate members 252 are bearings 258. The bearings 256 are located below the guides 258. The guides 258 retain the movement of the bearings 256 in a horizontal and/or upward direction. Downward movement of the rotatable sweeping devices 250 is restrained by the rollers 220, 230, 240, respectively. That is, the sweeping heads 254 engage the first overlapping roller 220, the first intermediate roller 230 and the rear roller 240, respectively, which in turn assists in retaining the rotatable sweeping devices 250 in the first body 210.

The first pivot mount 260 is located on top of the top wall 211. The first pivot mount 260 is pivotally connected to the frame 100. In particular, the first pivot mount 260 is pivotally connected to the frame 100 towards one of the end walls 130 of the frame 100. This positions the first undercarriage 200 to one side of the longitudinal axis 102 of the frame 100. The first pivot mount 260 allows the first undercarriage 200 to swivel in any direction in order to, for example, take into account undulations and imperfections in a ground surface.

Figure 4:
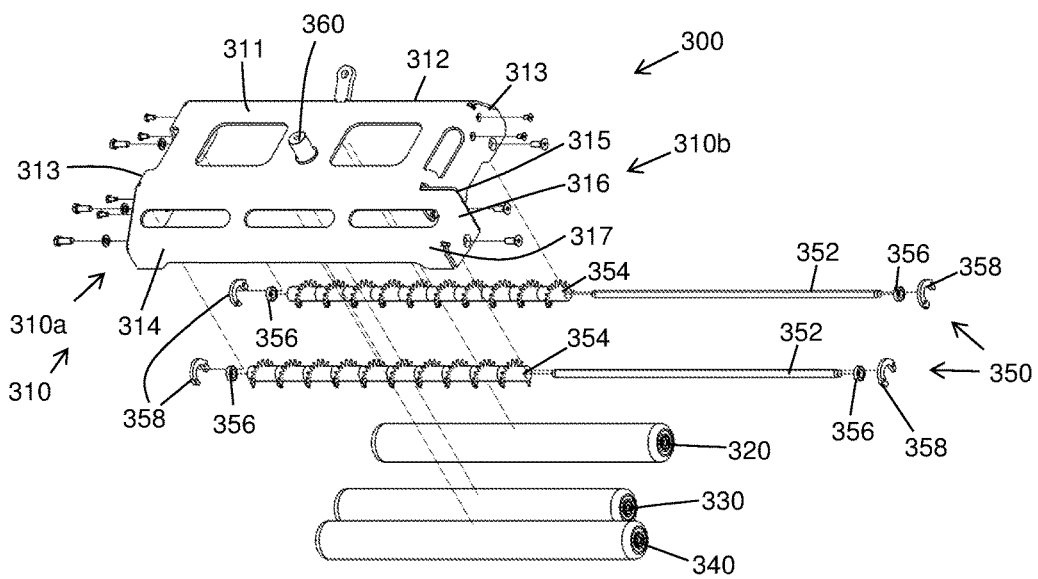
FIG. 4 illustrate an exploded view of another undercarriage shown in FIG. 1, according to an embodiment of the invention.

The second undercarriage 300 somewhat mirrors the first undercarriage 200. In this regard, as shown further in FIG. 4, the second undercarriage 300 includes a second body 310, a front roller 320, a second intermediate roller 330, a second overlapping roller 340, rotatable sweeping devices 350 and a second pivot mount 360. It would be appreciated that the second overlapping roller 340 may, for instance, be considered as a further rear roller or alike in the present context.

The second body 310 includes a second main portion 310a and a second offset portion 310b. The second main portion 310a includes a top wall 311, a front wall 312, side walls 313 and a rear wall 314. The front and rear walls 312, 314 extend at an acute angle from the top wall 311 but it would be appreciated that they may, for example, extend substantially perpendicular to the top wall 311 or alike. The side walls 313 extend substantially perpendicular from the top wall 311. The top wall 311, front wall 312, rear wall 314 and side walls 313 form an enclosure from which the second offset portion 310b extends.

The second offset portion 310b is out of line with the second main portion 310b. The second offset portion 310b includes a front wall 315, a side wall 316 and a rear wall 317. The first offset portion 310b extends in a direction substantially parallel with a longitudinal axis 302 of the second undercarriage 300. Accordingly, the first offset portion 310b extends substantially perpendicular from one of the side walls 313 of the first main portion 310a. As such, the front wall 315 and rear wall 317 extend substantially perpendicular to one of the side walls 313 of the first main portion 310a.

The second overlapping roller 340 is located between the side wall 316 of the second offset portion 310b and one of the side walls 313 of the second main portion 310a. The second overlapping roller 340 is elongate. The second overlapping roller 340 is located in rearward position relative to the first overlapping roller 220. In this regard, the first overlapping roller 220 and the second overlapping roller 340 are staggered in a (forward) direction along the lateral axis 104.

The first intermediate roller 330 and the front roller 320 are located between the side walls 313 and connected thereto. One end of the second overlapping roller 340 is therefore offset from the second intermediate roller 330 and/or the front roller 320.

The second overlapping roller 340 is located to one side of the longitudinal axis 302 of the second undercarriage 300 whilst the front roller 320 is located to the other side of the longitudinal axis 302. In particular, the second overlapping roller 340 is located near the rear wall 314 whilst the front roller 320 is located near the front wall 312.

The second intermediate roller 330 is located between the second overlapping roller 340 and the front roller 320. The distance between the second intermediate roller 330 and the front roller 320 is longer than the distance between the second intermediate roller 330 and the second overlapping roller 340. Accordingly, the second intermediate roller 330 is offset at a different distance between the second overlapping roller 340 and the front roller 320.

Similar to the first undercarriage 200 above, the second overlapping roller 340 is longer than the intermediate roller 330 and the front roller 320 in this embodiment. That is, the length of the second overlapping roller 340 is greater than the second intermediate roller 330 and the front roller 320. In addition, the second overlapping roller 340 projects completely across the front roller 320 and/or the second intermediate roller 330. That is, for example, if the front surface of the second overlapping roller 340 was taken along the lateral axis 104 to produce a corresponding figure on the front roller 320, this corresponding figure would completely cover the front roller 320.

The second overlapping roller 340 in this embodiment is also one continuous roller but it would be appreciated that the second overlapping roller 340 may be made up of a plurality of rollers that form the second overlapping roller 340. Typically, the second intermediate roller 330 and the front roller 320 are substantially the same length. With this in mind, the length of the first overlapping roller 220 is substantially the same as the second overlapping roller 340. Furthermore, the length of the rear roller 240, the first and second intermediate rollers 230, 330 and the front roller 320 are substantially the same. However, it would be appreciated that the rollers 220, 320, 230, 330, 240, 340 may be of different sizes and lengths.

The rotatable sweeping devices 350 are substantially the same as the rotatable sweeping device 250. In this regard, the rotatable sweeping devices 350 each include an elongate member 352 and a plurality of sweeping heads 354 located over the elongate member 352. The sweeping heads 354 are rotatable with respect to the elongate member 352.

Located at each end of the elongate members 352 are bearings 358. The bearings 356 are located below the guides 358. The guides 358 retain the movement of the bearings 356 in a horizontal and/or upward direction. Downward movement of the rotatable sweeping devices 250 is restrained by the rollers 320, 330, 340, respectively. That is, the sweeping heads 354 engage the second overlapping roller 340, the second intermediate roller 330 and the front roller 320, respectively, which in turn assists in retaining the rotatable sweeping devices 350 in the second body 310.

The second pivot mount 360 is located on top of the top wall 311. The second pivot mount 360 is pivotally connected to the frame 100. In particular, the second pivot mount 360 is pivotally connected to the frame 100 towards one of the end walls 130 of the frame 100. This positions the second undercarriage 300 to one side of the longitudinal axis 102 of the frame 100. The second pivot mount 360 allows the second undercarriage 300 to swivel in any direction in order to, for example, take into account undulations and imperfections in a ground surface.

In addition, the second undercarriage 300 is positioned adjacent to the first undercarriage 200 such that the first overlapping roller 220 overlaps the second overlapping roller 340. That is, when a projection is taken from the first overlapping roller 220 along the lateral axis 104, it will intersect with part of the second overlapping roller 340. In other words, the first overlapping roller 220 and the second overlapping roller 340 substantially mirror each other over the longitudinal axis 202, 302. In this regard, the first overlapping roller 220 is stagged relative to the second overlapping roller 340 such that they are positioned in different lateral and longitudinal locations.

Furthermore, between the first carriage 200 and second carriage 300 a gap is left therebetween. To this end, there is a gap between the first overlapping roller 220 and the front roller 320 (i.e. the front rollers) which is covered by the second overlapping roller 340. Similarly, there is a gap between the second overlapping roller 340 and the rear roller 240 (i.e. the rear rollers) which is covered by the first overlapping roller 220. On this basis, the rollers 220, 320, 230, 330, 240, 340 roll substantially the same width and the gaps therebetween are covered by the overlapping rollers 220, 340.

The driving assembly 400 includes a driving roller 410 and a driving connector. The driving connector is in the form of a sprocket 420 that is connected at an end of the driving roller 410. The sprocket 420 is connected to a motor (not shown) via a chain. The motor provides power to rotate the driving roller 410. Rotating the driving roller 410 moves the roller assembly 10 in either a forward or reverse direction. The driving roller 410 is located opposite the undercarriage 200, 300, near one of the end walls 130, in this embodiment.

The steering system 500 includes a first steering link 510 and a second steering link 520. The first steering link 510 is connected to the first undercarriage 200 and the second steering link 520 is connected to the second undercarriage 300. The steering links 510, 520 are connected to a steering column. In response to turning the steering column, the steering links 510, 520 pivot the undercarriages 200, 300 about their respective pivot mounts 260, 360. This is further illustrated in FIGS. 5 and 6.

Figure 5:
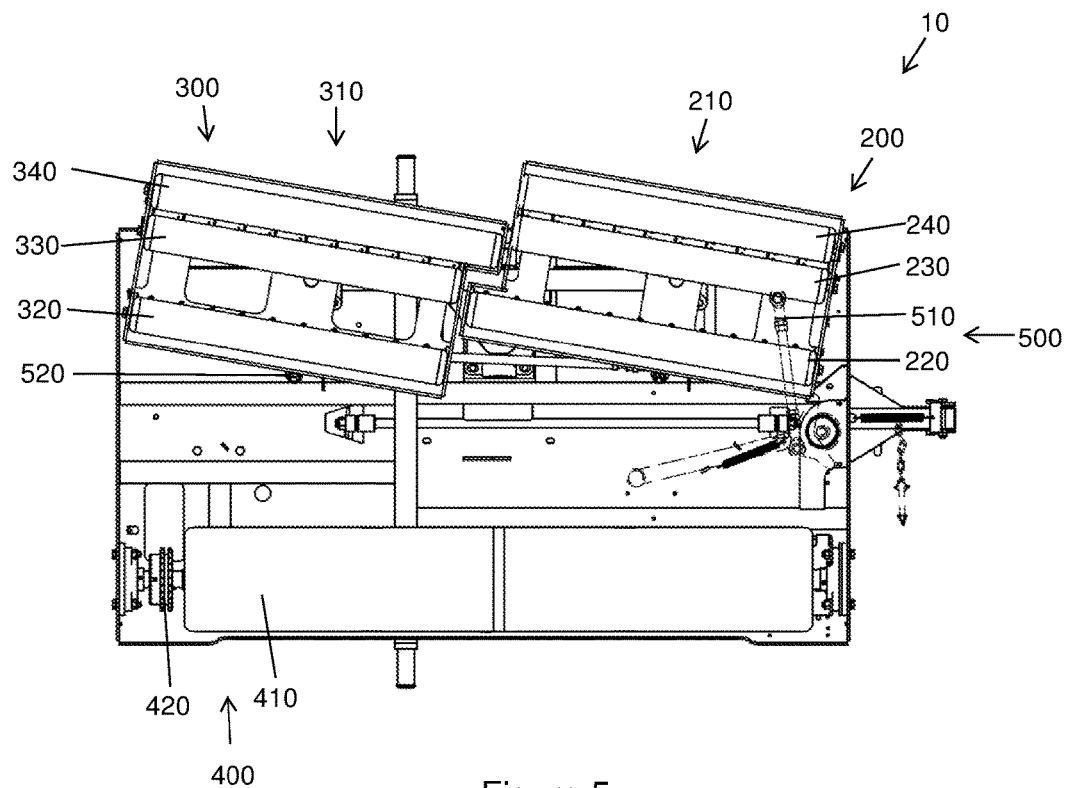
FIG. 5 illustrates the roller assembly shown in FIG. 1 in a first turning configuration.

As shown in FIG. 5, in response to turning the steering column in a first direction, the undercarriages 200, 300 are pivoted in a clockwise direction. This in turn results in the overlapping rollers 220, 340 moving towards each other. The direction of the undercarriages 200, 300 allows the roller assembly 10 to turn in the first direction.

Figure 6:
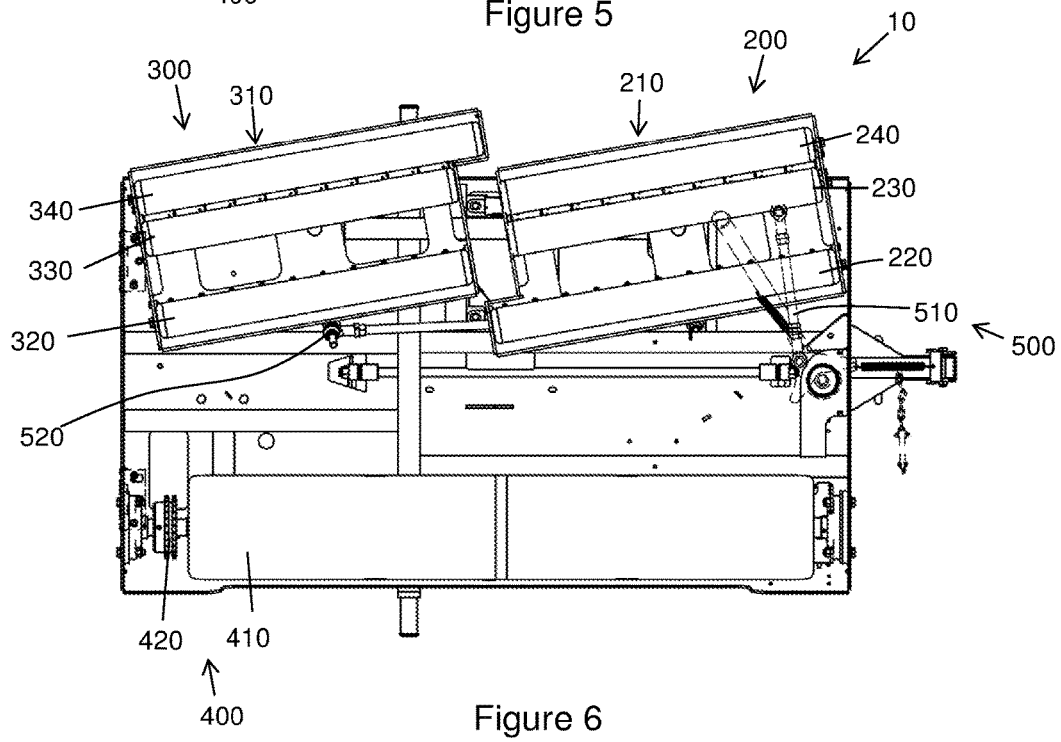
FIG. 6 illustrates the roller assembly shown in FIG. 1 in a second turning configuration.

As shown in FIG. 6, in response to turning the steering column in a second direction, the undercarriages 200, 300 are pivoted in an anti-clockwise direction. This in turn results in the overlapping rollers 220, 340 moving away from each other and the roller assembly 10 turning in the second direction. However, despite the overlapping rollers 220, 340 moving away from each other, the first overlapping roller 220 still overlaps the second overlapping roller 340. That is, when a projection is taken from the first overlapping roller 220 along the lateral axis 104, it will intersect with part of the second overlapping roller 340.

To travel in a straight direction, it would be appreciated that the steering column is turned such that the undercarriages 200, 300 face in a direction as shown in FIGS. 1 and 2.

Figure 7:
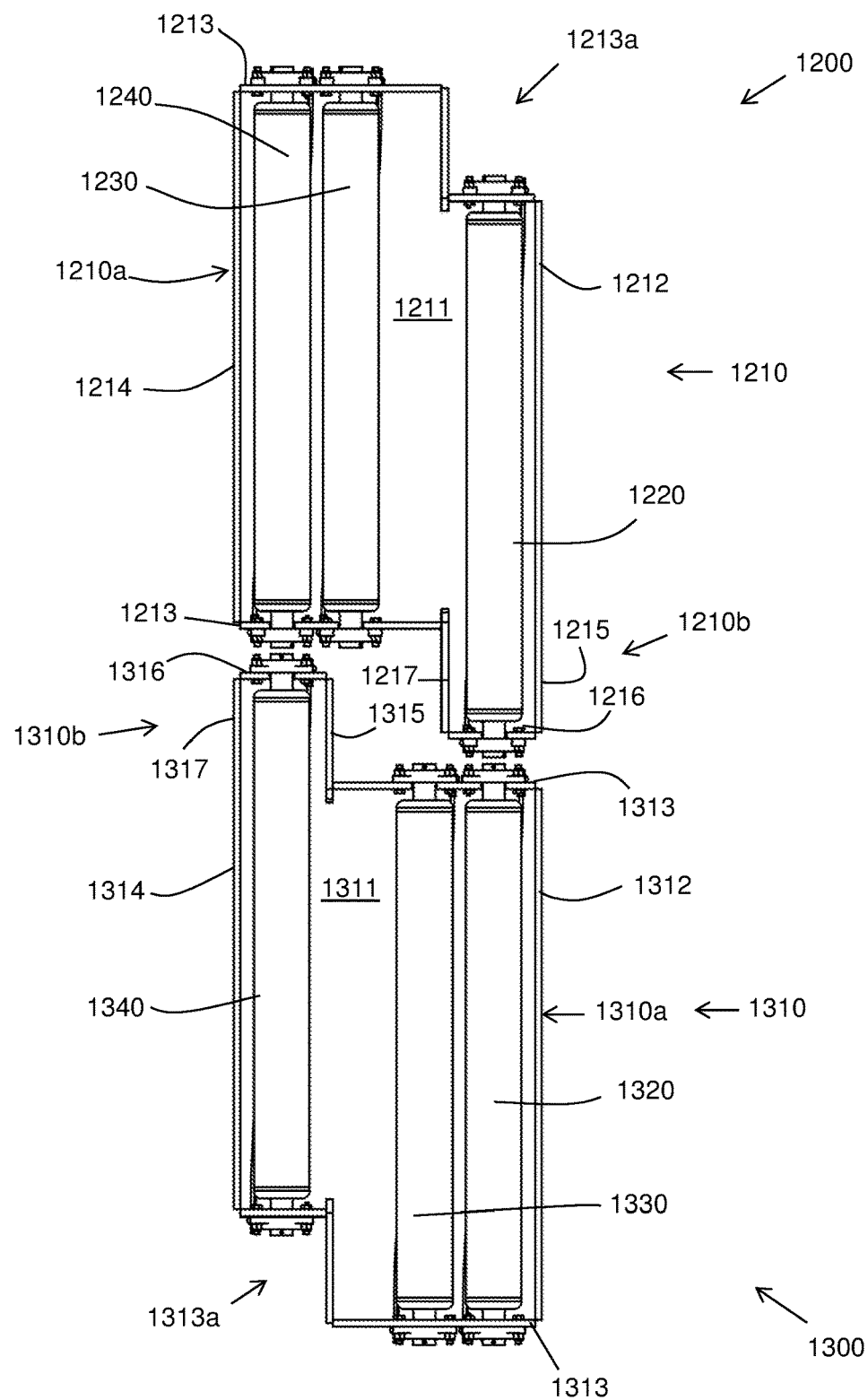
FIG. 7 illustrates a bottom view of two undercarriages, according to a further embodiment of the invention.

FIG. 7 illustrates a bottom view of undercarriages 1200, 1300, according to a further embodiment of the invention. As would be appreciated by a person skilled in the art, the undercarriages 1200, 1300 may be configured to, for instance, replace the undercarriages 200, 300 in the roller assembly 10.

The undercarriages 1200, 1300 respectively includes a body 1210, 1310, an overlapping roller 1220, 1340, an intermediate roller 1230, 1330 and front/rear rollers 1320, 1240.

The bodies 1210, 1310 respectively include a main portion 1210a, 1310a and an offset portion 1210b, 1310b. Similar to the undercarriages 200, 300, the main portions 1210a, 1310a respectively include a top wall 1211, 1311, a front wall 1212, 1312, side walls 1213, 1313 and a rear wall 1214, 1314.

In contrast to the undercarriages 200, 300, the side walls 1213, 1313 of the main portions 1210a, 1310a respectively include recess portions 1213a, 1313a. As outlined below, the recess portions 1213a, 1313a accommodate for the shorter overlapping rollers 1220, 1340 in this embodiment. The recess portions 1213a, 1313a are the opposite shape of the offset portions 1210b, 1310b.

The offset portions 1210b, 1310b, like the offset portions 210b, 310b, respectively include a front wall 1215, 1315, a side wall 1216, 1316 and a rear wall 1217, 1317. The offset portions 1210b, 1310b extend transversely from one of the side walls 1213, 1313.

The overlapping rollers 1220, 1340 are respectively located between the recess portions 1213a, 1313a and the side walls 1216, 1316 of the offset portions 1210b, 1310b. Similar to the overlapping rollers 220, 340, the overlapping rollers 1220, 1340 are elongate. The intermediate rollers 1230, 1330 and front/rear rollers 1320, 1240 are connected between respective side walls 1213, 1313. Both ends of the overlapping rollers 1220, 1340 are offset compared to the ends of the respective intermediate rollers 1230, 1330 and front/rear rollers 1320, 1240.

The overlapping roller 1220 is located to one side of the undercarriage 1200 whilst the intermediate roller 1230 and rear roller 1240 are located on an opposite side. In the same manner, the overlapping roller 1340 is located one side of the undercarriage 1300 whilst the intermediate roller 1330 and front roller 1320 are located on an opposite side. In this regard, the overlapping rollers 1220, 1340 are located at different forward positions. The intermediate rollers 1230, 1330 are respectively located between the overlapping rollers 1220, 1340 and the front/rear rollers 1320, 1240.

In comparison to the undercarriages 200, 300, the rollers 1220, 1230, 1240, 1320, 1330, 1340 of the undercarriages 1200, 1300 are substantially the same length. Furthermore, as the overlapping rollers 1220, 1340 are respectively offset relative to the front/rear rollers 1320,1240, the overlapping rollers 1220, 1340 respectively project across about four fifths of the front/rear rollers 1320, 1240. That is, for example, if the overlapping roller 1220 was projected in a straight direction towards the rear roller 1240 to produce a corresponding figure on the rear roller 1240, this corresponding figure would cover approximately four fifths of the rear roller 1240. In this regard, it would be appreciated by a person skilled in the art that the length of the overlapping rollers 1220, 1340 may be suitably varied in the present invention such that, for example, the overlapping rollers 1220, 1340 projects anywhere between a quarter to completely across the respective front/rear rollers 1240,1320.

In addition, it would also be appreciated by a person skilled in the art that the sweeping devices 250, 350, pivot mounts 260, 360 and so forth may be included in the carriages 1200, 1300.

The overlapping rollers 220, 340, 1220, 1340 overlap to ensure that no surface gap is left unrolled between the undercarriages 200, 300, 1200, 1300. This assists in providing a firm, smooth and consistent golf green. In particular, marks on the golf green are substantially avoided between the undercarriages 200, 300, 1200, 1300.

Moreover, the use of the first and second intermediate rollers 230, 330, 1230, 1300, at an offset distance, assists in gently smoothing our undulations and imperfections in a ground surface. Similarly, by allowing the undercarriages 200, 300 (1200, 1300) to pivot about their respective pivot mounts 260, 360, the angle of the undercarriages 200, 300 (1200, 1300) may adjust to ensure the contours of the ground surface are followed and an even pressure is applied thereto.

The rotatable sweeping devices 250, 350 assist in removing grass cuttings from the rollers 220, 320, 230, 330, 240, 340 (1220, 1320, 1230, 1330, 1240, 1340). Moreover, the respective relative movement between the elongate members 252, 352, the sweeping heads 254, 354, the bearings 256, 356 and guides 258, 358 further ensures that the rotatable sweeping devices 250, 350 do not become stuck relative to, for example, the rollers 220, 320, 230, 330, 240, 340.

Further to the above, in this specification adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

What is claimed is:

1. A roller assembly, the roller assembly including:
   a frame;
   a first undercarriage connected to the frame, the first undercarriage comprising:
   a first body;
   a rear roller connected to the first body; and
   a first overlapping roller that is elongate and connected to the first body; and
   a second undercarriage connected to the frame, the second undercarriage comprising:
   a second body;
   a front roller connected to the second body; and
   a second overlapping roller that is elongate and connected to the second body,
   wherein the first undercarriage is positioned adjacent to the second undercarriage such that the first overlapping roller overlaps the second overlapping roller,
   wherein the first undercarriage and the second undercarriage are pivotally connected to the frame,
   wherein, when the first and second undercarriages pivot in a first direction, the first and second overlapping rollers move towards each other,
   wherein, when the first and second undercarriages pivot in a second direction, the first and second overlapping rollers move away from each other, and
   wherein the first overlapping roller overlaps the second overlapping roller when the first and second undercarriages pivot in the first and second directions.

2. The roller assembly of claim 1, wherein the first overlapping roller is located forward of the second overlapping roller.

3. The roller assembly of claim 1, wherein the first overlapping roller is located substantially next to the front roller.

4. The roller assembly of claim 1, wherein the second overlapping roller is located substantially next to the rear roller.

5. The roller assembly of claim 1, wherein the first undercarriage and/or the second undercarriage are located to one side of a longitudinal axis of the frame.

6. The roller assembly of claim 1, wherein the first undercarriage is substantially located to one side of a lateral axis of the frame and the second undercarriage is substantially located to another side the lateral axis of the frame.

7. The roller assembly of claim 1, wherein the first undercarriage and the second undercarriage are substantially aligned.

8. The roller assembly of claim 1, wherein in a straight steering direction, the first overlapping roller, second overlapping roller, rear roller and/or front roller extend substantially parallel to the longitudinal axis of the frame.

9. The roller assembly of claim 1, wherein the first overlapping roller is located at a different distance from the longitudinal axis of the frame compared to the second overlapping roller.

10. The roller assembly of claim 1, wherein the first overlapping roller and the second overlapping roller extend up to and/or across the lateral axis of the frame.

11. The roller assembly of claim 1, wherein the first body includes a first main portion and a first offset portion extending away from the first main portion; and the second body includes a second main portion and a second offset portion extending away from the second main portion.

12. The roller assembly of claim 1, wherein at least one end of the first overlapping roller is unaligned with an end of the rear roller and/or at least one end of the second overlapping roller is unaligned with an end of the front roller.

13. The roller assembly of claim 1, wherein the first undercarriage includes a first intermediate roller and/or the second undercarriage includes a second intermediate roller.

14. The roller assembly of claim 13, wherein the first intermediate roller is longitudinally aligned with the second intermediate roller.

15. The roller assembly of claim 13, wherein a distance between the first intermediate roller and the first overlapping roller of the first undercarriage is shorter than a distance between the first intermediate roller and the rear roller of the first undercarriage and/or a distance between the second intermediate roller and the front roller of the second undercarriage is shorter than a distance between the second intermediate roller and the second overlapping roller of the second undercarriage.

16. The roller assembly claim 1, wherein the first undercarriage and/or the second undercarriage are connected at a first end of the frame.

17. The roller assembly of claim 16, wherein a driving roller is connected at another end of the frame.

18. A method for rolling a surface, the method including the steps of:
 rolling the surface with a front roller and a first overlapping roller, wherein the first overlapping roller is elongate, the first overlapping roller is part of a first roller assembly undercarriage and the front roller is part of a second roller assembly undercarriage; and
 rolling the surface with a rear roller and a second overlapping roller, wherein the second overlapping roller is elongate, the rear roller is part of the first roller assembly undercarriage and the second overlapping roller is part of the second roller assembly undercarriage,
 wherein, during rolling, the first undercarriage is positioned adjacent to the second undercarriage such that the first overlapping roller overlaps the second overlapping roller,
 wherein the first undercarriage and the second undercarriage are pivotally connected to a frame,
 wherein, when the first and second undercarriages pivot in a first direction, the first and second overlapping rollers move towards each other,
 wherein, when the first and second undercarriages pivot in a second direction, the first and second overlapping rollers move away from each other, and
 wherein the first overlapping roller overlaps the second overlapping roller when the first and second undercarriages pivot in the first and second directions.

19. The method of claim 18, wherein the method further includes the step of rolling the surface with a first intermediate roller.

20. The method of claim 19, wherein a distance between the first intermediate roller and the first overlapping roller of the first undercarriage is shorter than a distance between the first intermediate roller and the rear roller of the first undercarriage.

21. The method of claim 18, wherein the method further includes the step of rolling the surface with a second intermediate roller.

22. The method of claim 21, wherein a distance between the second intermediate roller and the front roller of the second undercarriage is shorter than a distance between the second intermediate roller and the second overlapping roller of the second undercarriage.

\* \* \* \* \*